(12) United States Patent
Triandopoulos et al.

(10) Patent No.: US 10,635,824 B1
(45) Date of Patent: Apr. 28, 2020

(54) METHODS AND APPARATUS FOR PRIVATE SET MEMBERSHIP USING AGGREGATION FOR REDUCED COMMUNICATIONS

(71) Applicant: EMC IP Holding Company LLC, Hopkinton, MA (US)

(72) Inventors: Nikolaos Triandopoulos, Arlington, MA (US); Kevin D. Bowers, Melrose, MA (US); James A. Kelley, Waltham, MA (US); Alina Oprea, Arlington, MA (US); Ronald Rivest, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 571 days.

(21) Appl. No.: 14/663,892

(22) Filed: Mar. 20, 2015

(51) Int. Cl.
*G06F 21/60* (2013.01)
*G06F 21/62* (2013.01)
*G06F 16/22* (2019.01)

(52) U.S. Cl.
CPC .......... *G06F 21/60* (2013.01); *G06F 16/2255* (2019.01); *G06F 21/602* (2013.01); *G06F 21/6245* (2013.01)

(58) Field of Classification Search
CPC ..... H04L 9/002; H04L 9/0825; H04L 9/0827; H04L 9/0838; H04L 9/3239; H04L 9/3242
USPC ................................. 370/252, 400
See application file for complete search history.

(56) References Cited

U.S. PATENT DOCUMENTS

| 8,499,355 B1* | 7/2013 | Goncharov | G06F 21/44 726/25 |
| 2009/0254572 A1* | 10/2009 | Redlich | G06Q 10/06 |
| 2010/0281269 A1* | 11/2010 | Kindarji | G06K 9/00087 713/182 |
| 2012/0207046 A1* | 8/2012 | Di Pietro | H04L 41/16 370/252 |

OTHER PUBLICATIONS

De Cristofaro et al. Practical Private Set Intersection Protocols with Linear Computational and Bandwidth Complexity, University of California, Irvine, Financial Cryptography 2010, pp. 143-159.

(Continued)

*Primary Examiner* — Alexander Lagor
*Assistant Examiner* — William B Jones
(74) *Attorney, Agent, or Firm* — Ryan, Mason & Lewis, LLP

(57) ABSTRACT

Methods and apparatus are provided for private set membership using aggregation for reduced communications. A determination is made as to whether at least one data element of a client is in a data set of a server by: obtaining a transformation of the at least one data element; receiving a response from the server based on the transformation of the at least one data element, wherein the transformation comprises one or more of a Bloom filter-based transformation that employs a Bloom filter comprising a plurality of hash functions and an encryption-based transformation; and determining whether the at least one data element is in the data set based on the response, wherein one or more of the response and the determining is based on a result of at least one aggregation of a plurality of values that depend on the at least one data element and one or more items in the data set.

34 Claims, 5 Drawing Sheets

(56) References Cited

OTHER PUBLICATIONS

Freedman et al. Efficient Private Matching and Set Intersection, Advances in Cryptology—Eurocrypt 2004 Lecture Notes in Computer Science vol. 3027, 2004, pp. 1-19.
Dong et al. When Private Set Intersection Meets Big Data: An Efficient and Scalable Protocol, Proceeding CCS '13 Proceedings of the 2013 ACM SIGSAC conference on Computer & communications security pp. 789-800.

\* cited by examiner

FIG. 1

C HAS AN ELEMENT $x$, AND
S HAS A SET $X = \{x_1,...,x_n\}$

↓

PRIVATE SET MEMBERSHIP PROCESS ⟵ 100

↓

110 — OBTAIN A TRANSFORMATION 115 OF THE DATA ELEMENT $x$;
120 — RECEIVE A RESPONSE 125 FROM $S$ BASED ON THE TRANSFORMATION OF THE DATA ELEMENT $x$; AND
130 — DETERMINE WHETHER THE DATA ELEMENT $x$ IS IN THE DATA SET $X$ BASED ON THE RESPONSE, WHERE THE RESPONSE AND/OR THE DETERMINATION ARE BASED ON A RESULT OF AT LEAST ONE AGGREGATION 135 OF A PLURALITY OF VALUES THAT DEPEND ON THE DATA ELEMENT $x$ AND AT LEAST ONE ITEM IN THE DATA SET $X$

Protocol summary Parties: client $C$ and server $S$
Possessions: $C$ has an element $x$ and $S$ has a set $X = \{x_1,...,x_n\}$
Tools(s): fully-homomorphic, public-key encryption 1. $C$ generates the key pair $(pk, sk)$ for a FHE scheme and sends $pk$ to $S$.
2. $C$ encrypts $x$ to get $c = \text{Enc}(pk, x)$ and sends $c$ to $S$.
3. $S$ computes $c'_i = c - \text{Enc}(pk, x_i)$ for each $x_i \in X$.
4. $S$ computes $r_i = c'_i * \text{Enc}(pk, \hat{r}_i)$, where $\hat{r}_i$ is a random value (for blinding non-zero results).
5. $S$ computes $r = \prod_{i=1}^{n} r_i$ and sends $r$ to $C$.
6. $C$ decrypts $r$ to get $a$. If $a = 0$, then $x \in X$, else $x \notin X$ and $a$ is a random value.

FIG. 3

Protocol summary Parties: client $C$ and server $S$
Possessions: $C$ has an element $x$ and $S$ has a set $X = \{x_1, \ldots, x_n\}$
Tool(s): additively-homomorphic, public-key encryption 1. $C$ generates a key pair $(pk, sk)$ for an additively homomorphic encryption scheme and sends $pk$ to $S$.
2. $S$ partitions $X$ into $\sqrt{n}$ equal-sized subsets $X_1, \ldots, X_{\sqrt{n}}$.
3. $S$ sends the number of subsets $\sqrt{n}$ to $C$.
4. For each subset $X_i$, $S$ interprets the elements $X_i = (x_{i,1}, \ldots, x_{i,\sqrt{n}})$ as the roots of a polynomial $p_i(X) = \hat{r}_i \prod_{j=1}^{\sqrt{n}} (X - x_{i,j})$ (where $\hat{r}_i$ is a random value for blinding) and computes the coefficients of $p_i(X)$, $z_{i,0}, \ldots, z_{i,\sqrt{n}-1}$ in group defined by $pk$.
5. $C$ computes the powers of $x$: $1, x, x^2, \ldots, x^{\sqrt{n}-1}$ and sends $\mathrm{Enc}(pk, x^i)$ for $i \in [0, \sqrt{n}-1]$
6. $S$ uses the homomorphic properties of the cipher to compute $e_i = \mathrm{Enc}(p_i(x)) = \sum_{j=0}^{\sqrt{n}-1} z_j \, \mathrm{Enc}(pk, x^j)$ for each subset.
7. $S$ ends $e_1, \ldots, e_{\sqrt{n}}$ to $C$
8. $C$ decrypts each $e_i$, if any are 0, then $x \in X$, else the decrypted values are random (via the $\hat{r}_i$ term in each $p_i$).

FIG. 4

```
┌─ 400
│ Protocol summary Parties: client C and server S
│ Possessions: C has an element x and S has a set X = {x_1,...,x_n}
│ Tools(s): memory-hard hash function f
│
│ 1. S computes H = {h_i | h_i = f(x_i), x_i ∈ X}
│ 2. C computes h_x = f(x) and sends h_x to S
│ 3. S tests whether or not h_x ∈ H and sends back the response
```

FIG. 5

```
┌─ 500
│ Protocol summary Parties: client C and server S
│ Possessions: C has an element x and S has a set X = {x_1,...,x_n}
│ Tools(s): Bloom filter with k hash functions h_1,...,h_k
│
│ 1. S computes the Bloom filter B for X with m = (1/ln 2)kn bits,
│    where |X| = n
│ 2. S sends descriptions of h_1,..., h_k to C
│ 3. C computes q_i = h_i(x) for i ∈ [1,k]
│ 4. C sends q_1,...,q_k to S to fetch the corresponding bits from B
│ 5. S computes q = ∧_{i=1}^{k} B[q_i], where B[j] is the j-th bit of the Bloom
│    filter B and ∧ is bit-wise AND.
│ 6. S sends q back to C
│ 7. If q = 0, then x ∉ X. If q = 1, then x ∈ X with high probability
│    (specifically, with probability 1 − 2^{−k}).
```

Parties: client $C$ and server $S$
Possessions: $C$ has an element $x$ and $S$ has a set $X = \{x_1,...,x_n\}$
Tools(s): Bloom filter with $k$ hash functions $h_1,...,h_k$, (single-server, computational) PIR scheme $\mathcal{P}$ 1. $S$ computes the Bloom filter $B$ for $X$ with $m = (1/\ln 2)kn$ bits, where $|X| = n$
2. $S$ sends descriptions of $h_1,..., h_k$ to $C$.
3. $C$ computes $q_i = h_i(x)$ for $i \in [1,k]$
4. $C$ uses $k$ parallel invocations of $\mathcal{P}$ to retrieve bits $q_1,...,q_k$.
5. $C$ computes $q = \wedge_{i=1}^{k} B[q_i]$, where $B[j]$ is the $j$-th bit of the Bloom filter $B$ and $\wedge$ is bit-wise AND.
6. If $q = 0$, then $x \notin X$. If $q = 1$, then $x \in X$ with high probability (specifically, with probability $1 - 2^{-k}$).

Protocol summary Parties: client $C$ and (non-communicating, non-colluding) servers $S_1$ and $S_2$
Possessions: $C$ has an element $x$, $S_1$ has a set $X = \{x_1,...,x_n\}$, $S_2$ will hold a Bloom filter $B$
Tools(s): OPRF scheme $\mathcal{F}$ for a PRF $f$, Bloom filter with $k$ hash functions $h_1,...,h_k$, derived from $f$ 1. $S_1$ generates a random key $k$ uses $f_k(\cdot)$ to create the Bloom filter $B$ (possibly acting as both the Sender and Receiver in the OPRF protocol, if necessary).
2. $S_1$ sends $B$ to $S_2$ keeps $k$.
3. $C$ then interacts with $S_1$ using $\mathcal{F}$ to learn $q_i = h_i(x)$ for $i \in [1,k]$.
4. $C$ queries the Bloom filter bits in locations $q_1,..., q_k$ directly from $S_2$.
5. $C$ determines membership based on bit-wise AND performed on queried bits.

METHODS AND APPARATUS FOR PRIVATE SET MEMBERSHIP USING AGGREGATION FOR REDUCED COMMUNICATIONS

FIELD

The field relates generally to private set intersection, and more particularly to private set membership schemes.

BACKGROUND

In a private set intersection (PSI) protocol, a client having a set $X_1$ and a server having a set $X_2$ jointly compute the intersection of their respective private input sets in a manner that, at the end, the client learns the intersection and the server learns nothing. Existing private set intersection protocols require communication that is linear in the sizes of the sets, that is, they incur communication cost of $O(|X_1|+|X_2|)$. This cost is prohibitive when the interactions between the client and the server are frequent, especially when the server stores a large data set. For example, the costs are particularly prohibitive for a smart phone privately checking the validity of a user's credentials against a database that contains millions of elements.

Thus, a need exists for lightweight set membership techniques wherein the communication cost is sublinear in the size of the sets held by the client and the server.

SUMMARY

Illustrative embodiments of the present invention provide methods and apparatus for private set membership using aggregation for reduced communications. In one embodiment, a determination is made as to whether at least one data element of a client is in a data set of a server by: obtaining a transformation of the at least one data element; receiving a response from the server based on the transformation of the at least one data element, wherein the transformation comprises one or more of a Bloom filter-based transformation that employs a Bloom filter comprising a plurality of hash functions and an encryption-based transformation; and determining whether the at least one data element is in the data set based on the response, wherein one or more of the response and the determining is based on a result of at least one aggregation of a plurality of values that depend on the at least one data element and one or more items in the data set.

In one exemplary embodiment, the encryption-based transformation comprises an encrypted version of the at least one data element, wherein the response comprises a product aggregation of values, wherein each of the values comprises a comparison between the encryption-based transformation of the at least one data element and an encrypted version of an item in the data set, and wherein the determining whether the at least one data element is in the data set comprises evaluating a decrypted version of the response and determining whether the result of the decryption evaluation has a predefined value.

In another exemplary embodiment, the encryption-based transformation comprises an encrypted version of d powers of the at least one data element, wherein the at least one aggregation comprises at least one aggregation of values for each subset in a plurality of subsets in a partition of the data set, wherein each of the subsets has at least two items, and wherein the values for each of the subsets are based on one or more comparisons of one or more of the encrypted version of d powers of the at least one data element and an encrypted version of the one or more items in the subset, wherein for each of the subsets, the at least one aggregation comprises a sum over weighted versions of the encrypted version of d powers of the at least one data element, wherein the weighted versions comprise a weighted sum aggregation of the encrypted version of the one or more items in the subset, wherein the determining whether the at least one data element is in the data set comprises determining whether a decrypted version of each of the final results for one or more of the subsets has a predefined value.

In yet another exemplary embodiment, the Bloom filter-based transformation of the at least one data element comprises a mapping of the at least one data element to k hash values by applying k hash functions to the at least one data element, wherein the k hash functions are defined by the Bloom filter, wherein the response is based on the result of at least one aggregation and wherein the at least one aggregation comprises performing a bit-wise aggregation of k bits from the Bloom filter stored at the server, wherein a selection of the k bits is based on the mapping and wherein the k bits depend on the one or more items in the data set by employing the k hash functions, and wherein the determining whether the at least one data element is in the data set comprises determining whether the result of the bit-wise aggregation has a predefined value.

In a further exemplary embodiment, the Bloom filter-based transformation of the at least one data element comprises a mapping of the at least one data element to k hash values by applying k hash functions to the at least one data element, wherein the k hash functions are defined by the Bloom filter, wherein the response comprises k bits from the Bloom filter stored at the server, wherein the k bits are obtained using a private information retrieval (PIR) scheme, wherein a selection of the k bits is based on the mapping, wherein the k bits depend on one or more items in the data set by employing the k hash functions, and wherein the determining whether the at least one data element is in the data set comprises performing a bit-wise aggregation of at least a portion of the k bits and determining whether the result of the bit-wise aggregation has a predefined value.

In an additional exemplary embodiment, the Bloom filter-based transformation of the at least one data element comprises a mapping of the at least one data element to k hash values by applying k hash functions to the at least one data element, wherein the k hash functions are defined by the Bloom filter, wherein the Bloom filter-based transformation of the at least one data element is obtained from the server as part of the response, wherein the response from the server comprises the Bloom filter-based transformation of the at least one data element and wherein the k hash functions of the mapping each comprises an oblivious pseudo random function (OPRF), and wherein the determining whether the at least one data element is in the data set comprises obtaining a bit-wise aggregation of k bits from the Bloom filter stored at a second server and obliviously obtained from the server, wherein a selection of the k bits is based on the mapping and wherein the k bits depend on one or more items in the data set by employing the k OPRFs, and determining whether the result of the bit-wise aggregation has a predefined value.

Embodiments of the invention can be implemented in a wide variety of different applications wherein an analysis of set membership is desired.

BRIEF DESCRIPTION OF THE DRAWINGS

FIG. 1 is a flow chart illustrating an exemplary implementation of a private set membership process incorporating aspects of the present invention;

FIG. 2 illustrates exemplary pseudo code for an exemplary encryption-based protocol for a fully homomorphic encryption scheme;

FIG. 3 illustrates exemplary pseudo code for an exemplary encryption-based protocol based on polynomials that is related to the protocol of FIG. 2 and for a particular parameterization choice;

FIG. 4 illustrates exemplary pseudo code for an exemplary hash-based scheme;

FIG. 5 illustrates exemplary pseudo code for an exemplary hash-based protocol based on Bloom filters;

FIG. 6 illustrates exemplary pseudo code for an exemplary hash-based protocol utilizing Bloom filters and a private information retrieval scheme in accordance with an aspect of the present invention;

FIG. 7 illustrates exemplary pseudo code for an exemplary hash-based scheme utilizing two-server Bloom filters and an oblivious pseudo random function (OPRF) protocol in accordance with an aspect of the present invention;

DETAILED DESCRIPTION

Figure 8:
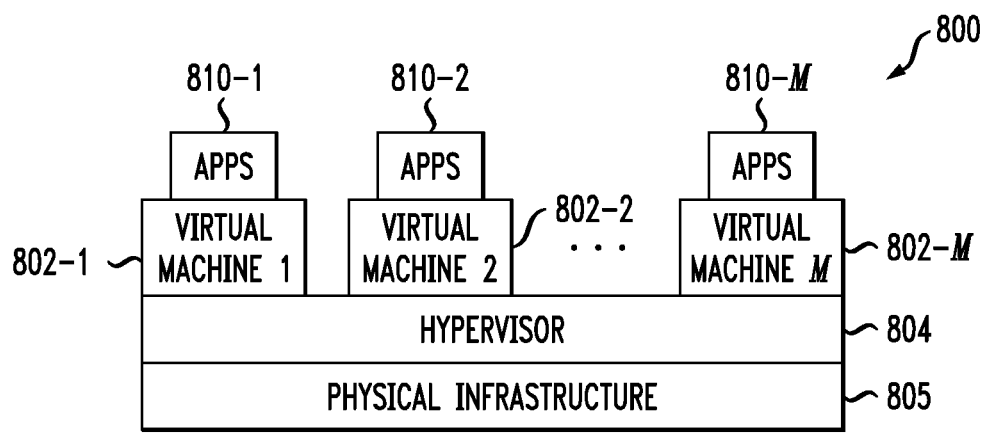
FIG. 8 illustrates an exemplary processing platform that may be used to implement at least a portion of one or more embodiments of the invention comprising a cloud infrastructure.

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

As will be described, the present invention in one or more illustrative embodiments provides methods and apparatus for private set membership using aggregation techniques to reduce the necessary communications and/or computations. According to one aspect of the invention, a determination is made about whether at least one data element of a client is in a data set of a server. The data set of the server comprises a plurality of items. The at least one data element and the items in the data set are transformed using a Bloom filter-based transformation that employs a Bloom filter comprising a plurality of hash functions or an encryption-based transformation. In addition, at least one aggregation is performed of a plurality of values that depend on the at least one data element and one or more items in said data set. Aspects of the present invention recognize that the aggregation allows for set membership techniques wherein the communication and/or computation costs are sublinear in the size of the sets held by the client and the server.

In one exemplary implementation, methods and apparatus are provided for efficient privacy-preserving credential or property validation, wherein a user validates a personal credential or property with respect to some well-defined criterion through a credential- or property-validation service offered by a remote (e.g., enterprise or cloud-provided) server that possesses a large database recording updated state related to the validity criterion in consideration. The disclosed exemplary techniques simultaneously achieve the following two desirable properties:

1. The user is able to validate his or her personal credentials or properties without revealing anything about these credentials or properties to the validation server and, conversely, without inferring anything about the current database other than what is inferred by the credential or property validation or failure; and 2. The interaction between the user and the server involves minimal communication and client-side computation costs that are sub-linear or poly-logarithmic on the server's database size.

Thus, the disclosed techniques find numerous applications in settings wherein thin-clients (e.g., mobile users) need to securely, that is privately, and efficiently perform real-time credential-validity or property-validation checks against an online validation service. For instance, a user may privately and efficiently check that his or her password is distinct from the set of currently used passwords in an enterprise or the set of passwords that are currently known to have been leaked after a recent attack, or even check that his or her passwords are of an appropriate minimum entropy. Alternatively, a user may privately and efficiently check whether his or her credit card number has been stolen by some recent attack that is known to have compromised millions of credit card numbers. Similarly, a user may privately and efficiently check whether a personal genetic or health related property relates to the corresponding genetic or health related properties of a large population of people kept at a property-validation server, by checking, for instance, whether private information from his or her genome is related to private information from the genomes of people who are known to suffer from or are prone to be diagnosed of having a particular disease.

As discussed hereinafter, the disclosed exemplary design framework provides a new model for privacy-preserving interactions among two mutual distrustful parties by reducing credential or property validation to the problem of private set membership and then providing protocols that allow for privately checking the inclusion of a query element (e.g., a credit card number) into the server's database set (e.g., a list of known stolen credit card numbers from, say, an attack against a particular retailer). Finally, the disclosed exemplary framework allows the disclosed private set membership protocols to be applied in other computational settings on business models wherein privacy-preserving "credential" or "property" management is required (e.g., across enterprises, wherein a suspicious Internet Protocol (IP) address is checked against the list of known malicious IP addressed, or across financial institutions, security companies and credit card issuers, wherein upon unsuccessful validation of a credit card number in a financial transaction, the credit card issuer is notified to take follow-up actions).

INTRODUCTION

As noted above, aspects of the present invention address a problem of checking the validity of a credential or property, or simply called element hereinafter, against a current database that encodes information about credentials or properties in a privacy-preserving manner. Consider a client C, holding an element x, interacting with a server S, holding database X, in a secure exemplary protocol which allows C to determine whether x satisfies a given "safety" condition in a way so that neither x nor "whether x is safe" is revealed to S, and X is not revealed to C, other than whether x satisfies the given safety condition.

The problem becomes a representative special case of private set membership, wherein the safety test checked by the client is whether x is a member of database X (i.e., whether x∈X).

Clearly, private set membership can be solved using a private set intersection (PSI) protocol, which allows C and S to interact in a privacy-preserving manner so that C learns the intersection $X_1 \cap X_2$, wherein $X_1$ is a set held by client C and $X_2$ the set held by server S. Indeed, if $X_1$=x and $X_2$=X, then learning $X_1 \cap X_2$ corresponds to exactly learning whether x∈X.

All existing private set intersection protocols require communication that is linear in the sizes of the sets, that is, they incur communication cost of $O(|X_1|+|X_2|)$. This cost is prohibitive for frequent interactions between a thin client (e.g., a smart phone) for checking validity of credentials against large databases, which typically contain millions of elements. Thus, a need exists to devise lightweight set membership protocols wherein the communication cost is sublinear in $|X_1|$ and $|X_2|$.

Accordingly, although, the $O(|X_1|+|X_2|)$ cost is intuitively "necessary," in order to prevent the server from learning the result of the intersection $X_1 \cap X_2$ and thereby learning new information about $X_1$, more efficient solutions are needed for the specific problem under consideration, the private set membership problem which is a special case of the private set intersection problem. Ideally, some computation should be performed at the server and have S "summarize" the results (in some way) without knowing what the summary says. This summarization should be performed through some form of privacy-preserving transformations of the queried element and data elements involved in the computation, as well as some form of privacy-preserving aggregations computed over values that depend on one or more of the query element and data elements involved in the computation or on their corresponding transformations.

In general, aspects of the present invention address a special case of the private set intersection (PSI) problem in a context wherein one party has a set that is much smaller than the other party's set. For example, C may just have a single element $X_1$={x} and C wants to know if x∈$X_2$ wherein $X_2$ is the set held by S. In general, $|X_1|=|X_2|$, wherein |•| denotes set cardinality. For simplicity, let C denote the client, who has the small set, and S denote the server, who has the large set.

Aspects of the present invention provide a number of exemplary private set membership constructions that solve the above problem both privately and efficiently. One group of exemplary private set membership constructions employ an encryption-based transformation, such as a homomorphic encryption (see, for example, the section entitled "Constructions Based On Encryption"). Another group of exemplary private set membership constructions employ a hashing-based scheme, such as a Bloom filter-based transformation that employs a Bloom filter comprising a plurality of hash functions (see, for example, the section entitled "Constructions Based on Hashing").

As discussed hereinafter, one or more of the disclosed schemes can optionally be optimized utilizing a simple partitioning scheme. In particular, the server's set can be deterministically partitioned into, say, p disjoint subsets and the schemes below can be applied to individual partitions instead of the whole set. This can significantly reduce the computational costs. The partitioning can be done with any public deterministic function that will distribute the set elements uniformly among the partitions. A secure hash function such as SHA256 could serve this purpose (e.g., hash the element and then put the element into one of the partitions by looking at the top log p bits).

FIG. 1 is a flow chart illustrating an exemplary implementation of a private set membership process 100 incorporating aspects of the present invention. Generally, the exemplary private set membership process 100 determines whether at least one data element of a client is in a data set of a server. The exemplary private set membership process 100 is illustrated from the perspective of the client.

As shown in FIG. 1, the exemplary private set membership process 100 processes an element x from the client C and a set X={$x_1, \ldots, x_n$} from the server S. During step 110, the client initially obtains a transformation 115 of the data element x. The transformation 115 comprises either an encryption-based transformation, as discussed further below in conjunction with FIGS. 2 and 3, or a hash-based transformation, such as a Bloom filter-based transformation that employs a Bloom filter comprising a plurality of hash functions, as discussed further below in conjunction with FIGS. 4 through 7.

The client C receives a response 125 from the server S during step 120 based on the transformation of the data element x. The client C then determines whether the data element x is in the data set X during step 130 based on the response. In the various implementations discussed below in conjunction with FIGS. 2 through 7, the response and/or the determination are based on a result of at least one aggregation 135 of a plurality of values that depend on the data element x and at least one item in the data set X. The aggregation 135 provides set membership techniques wherein the communication cost is sublinear in the sizes of the sets held by the client and the server.

Constructions Based on Encryption

Scheme Based on Fully Homomorphic Encryption

Let E denote a fully homomorphic encryption scheme over a field F. (Assume that the set elements are elements of F.) The client simply encrypts each element in $X_1$={$y_1, \ldots, y_m$}, wherein $X_1$ is a set held by client C, and the client sends the ciphertexts $E_{pk}(y_1), \ldots, E_{pk}(y_m)$ to S, wherein pk is the public key of C. The server then subtracts each $x_i \in X_2$={$x_1, \ldots, x_n$} from each $E_{pk}(y_i)$ and multiplies by a random $r_{i,j} \in F\setminus\{0\}$ to get $E_{pk}(r_{i,j}(y_i-x_j))$ for 1≤i≤m and 1≤j≤n. For each $y_i$, S computes the product $\prod_{j=1}^{n} E_{pk}(r_{i,j}(y_i-x_j))=E_{pk}(\prod_{j=1}^{n} r_{i,j}(y_i-x_j))$. The server then sends the m ciphertexts back to C. If $y_i \in X_2$, that is, if $y_i=x_j$ for some j, then the resulting ciphertext is an encryption of 0 and C knows that $y_i$ is in the intersection. If $y_i \notin X_2$, then the ciphertext decrypts to a random value.

The communication cost is $O(|X_1|)$ and in the case wherein C only has a single element, the communication is O(1). The server, however, must perform O(mn) additions and O(mn) multiplications on the ciphertext, which can be expensive (especially for a fully homomorphic encryption (FHE) scheme).

FIG. 2 illustrates exemplary pseudo code 200 for an exemplary encryption-based protocol for a fully homomorphic encryption scheme, for a client C and server S, wherein C has an element x, and S has a set X={$x_1, \ldots, x_n$}. As shown in FIG. 2, during step 1, C generates the key pair (pk,sk) for a FHE scheme and sends pk to S. During step 2, C encrypts x to get c=Enc(pk,x) and sends c to S. S computes $c'_i$=c−Enc(pk,$x_i$) for each $x_i \in X$ during step 3. During step 4, S computes $r_i=c'_i * Enc(pk,\hat{r}_i)$, wherein $\hat{r}_i$ is a random value (for blinding non-zero results). During step 5, S computes $r=\Pi_{i=1}^n r_i$ and sends r to C. Finally, during step 6, C decrypts r to get a. If a=0, then $x \in X$, else $x \notin X$ and a is a random value.

Thus, for the exemplary encryption-based protocol of FIG. 2, in conjunction with the embodiment of FIG. 1, the transformation 115 in step 2 comprises an encrypted version of the at least one data element x and the response 125 in step 5 is based on a result of at least one aggregation 135 (i.e., a product) of a plurality of $r_i$ values computed by the server in step 5. The $r_i$ values are based on comparisons between the encryption-based transformation of the data element and an encrypted version of each item in the data set, computed during step 3. The determination 130 of whether the data element x is in the data set X requires the client C to decrypt the response r 125 during step 6 and to determine whether the decrypted response has a predefined value.

More Efficient Scheme Based on Polynomials

It is possible to do less computation at the expense of additional communication while only requiring that the encryption scheme E be additively homomorphic. Consider the case wherein C has only a single element x. For notational simplicity, let X be the set held by S. The server divides X into a partition of p equal-sized subsets $X_1, \ldots, X_p$, wherein $|X_i|=d$. For each subset $X_i$, S then computes the polynomial $q_i(t)=\Pi_{x_j \in X_i} r_i(t-x_j)=\Sigma_{j=0}^d u_{i,j} t^j$, for some random $r_i$, and saves the coefficients $u_{i,j}$. Note that $q_i$ has degree d.

C computes the values $x^i$ for $1 \le i \le d$, encrypts the results with an additively homomorphic cipher, and sends the ciphertexts to S. Now, S has the ciphertexts $E_{pk}(x), \ldots, E_{pk}(x^d)$ and can use the additive homomorphism property of E to evaluate $E_{pk}(q_i(x))=\Sigma_{j=0}^d u_{i,j} E_{pk}(x^j)$ for each $1 \le i \le p$. Recall that since $u_{i,j}$ is unencrypted, the product $u_{i,j} E_{pk}(x^j)$ amounts to adding $E_{pk}(x^j)$ to itself $u_{i,j}$ times. S then sends back $E_{pk}(q_1(x)), \ldots, E_{pk}(q_p(x))$. C decrypts each ciphertext and if the decrypted value is 0 for any of $q_i$, then C knows that $x \in X$ (C knows that x is in the partition). If x is not in a given subset $X_i$ in the partition, then the decrypted value is random.

FIG. 3 illustrates exemplary pseudo code 300 for an exemplary encryption-based protocol based on polynomials that is related to the protocol 200 of FIG. 2. The exemplary pseudo code 300 of FIG. 3 has communication complexity O(d+p). The variation requires d exponentiations and encryptions from the client, as well as p decryptions. The server must generate p polynomials of degree d and perform p evaluations each taking d multiplications and additions, for a total evaluation cost of approximately O(dp)=O(|X|). Total communication complexity is minimized for the specific parameterization choice when $d=p=\sqrt{|X|}$. Fundamentally, this is p parallel invocations of oblivious polynomial evaluation with the polynomials all evaluated at the same point, applied to set membership.

As shown in FIG. 3, during step 1, C generates a key pair (pk,sk) for an additively homomorphic encryption scheme and sends pk to S. During steps 2 and 3, S partitions X into $\sqrt{n}$ equal-sized subsets $X_1, \ldots, X_{\sqrt{n}}$ and S sends the number of partitions $\sqrt{n}$ to C. For each subset $X_i$, S interprets the elements $X_i=\{x_{i,1}, \ldots, x_{i,\sqrt{n}}\}$ during step 4 as the roots of a polynomial $p_i(X)=\hat{r}_i \Pi_{j=1}^{\sqrt{n}}(X-x_{i,j})$ (wherein $\hat{r}_i$ is a random value for blinding) and computes the coefficients of $p_i(X)$, $z_{i,0}, \ldots, z_{i,\sqrt{n}-1}$ in a group defined by pk.

C computes the powers of x during step 5: $1, x, x^2, \ldots, x^{\sqrt{n}-1}$ and sends $Enc(pk, x^i)$ for $i \in [0, \sqrt{n}-1]$. S uses the homomorphic properties of the cipher during step 6 to compute $e_i=Enc(p_i(x))=\Sigma_{j=0}^{\sqrt{n}-1} z_j Enc(pk, x^j)$ for each subset. S sends $e_1, \ldots, e_{\sqrt{n}}$ to C during step 7 and C decrypts each $e_i$ during step 8, if any are 0, then $x \in X$, else the decrypted values are random (via the $\hat{r}_i$ term in each $p_i$).

Thus, for the exemplary encryption-based protocol of FIG. 3, in conjunction with the embodiment of FIG. 1, the transformation 115 in step 5 comprises an encryption-based transformation that generates an encrypted version of powers of the data element x (i.e., $Enc(pk, x^i)$ for $i \in [0, \sqrt{n}-1]$). In addition, the response 125 ($e_1, \ldots, e_{\sqrt{n}}$) is computed by the server S during step 6 based on a result of an aggregation 135 of values for each subset in a partition of the data set X, wherein each subset has at least two items, and wherein the values for each subset are based on comparisons of the encrypted versions of d powers of the data element and/or encrypted versions of the items in the subset. For each subset, the aggregation 135 optionally comprises a weighted sum over a weighted version of the encrypted versions of d powers of the data element. The exemplary weight comprises a randomized weighted sum aggregation of the encrypted versions of one or more items in the subset. The determination 130 of whether the data element is in the data set comprises evaluating a decrypted version of each of the results for one or more subsets and determining whether each of the results of the decryption evaluations has a predefined value.

The response for each subset allows an incremental determination of whether the data element is in the data set.

Constructions Based on Hashing

Hashing-Based Scheme

Consider loosening the requirements of the set-membership protocol and allowing the server to learn the queried value x only if it is in the server's set X. This corresponds to the scenario wherein a client is querying membership in a set, and would like to do so privately, but if the client's element is in the set then the client would like to perform some action and (possibly) interact further with the server. For example, if the set is a collection of stolen credit card numbers, a client would not want to reveal an uncompromised number; but if their number is stolen, then the server (which is assumed to be honest-but-curious) can possibly aid the client (e.g., by facilitating contact with credit monitoring agencies).

One method of doing this is for the server to hash all of the elements in its set and for the client to submit the hash of its own request. The server then compares the client's hash against its set of hashes and returns the answer. However, this scheme succumbs to an honest-but-curious server since the client's hash can be attacked with a brute force analysis. Adding a random salt to the client's hash mitigates this risk, but increases the server's computational costs since the server would need to recompute the hash for every element using the client-chosen salt. Moreover, the server would need to do this for every client query.

Instead, a sequential, memory-hard function (first defined in Colin Percival, Stronger Key Derivation Via Sequential Memory-Hard Functions, http://www.tarsnap.com/scrypt/scrypt.pdf, 2009, incorporated by reference herein) is utilized for the computation of the hash. Intuitively, a memory-hard function is one that utilizes (almost) as many memory locations as there are total operations in the function. A memory-hard function is sequential if it does not admit a parallel implementation that significantly reduces the time-memory product of the function. More specifically, if a memory-hard function $f$ uses T(n) time and S(n) space (so $S(n)=O(T(n)^{1-\epsilon})$) on input of size n, then $f$ is a sequential if there is no parallel version using time T*(n) and space S*(n)

such that $T^*(n)S^*(n)<O(T(n)^{2-x})$ for any $x>0$. Intuitively, this means that, even utilizing specialized hardware and many parallel central processing unit (CPU) cores, a parallel algorithm has the same cost as the naïve sequential algorithm. These functions were designed to exploit the fact that CPU speeds have been growing faster than memory speeds, so increases in CPU speed do not directly translate to more-power to compute a memory-hard function. As an alternative, a time-lock puzzle (described in Ronald L. Rivest et al., "Time-Lock Puzzles and Timed-Release Crypto," Technical Report MIT-LCS-TR-684, Cambridge, Mass., USA, 1996. http://publications.csail.mit.edu/lcs/pubs/pdf/M1T-LCS-TR-684.pdf, incorporated by reference herein) can be used to ensure that a certain minimum amount of time must pass (relative to an estimate of current and future computational power) before the computation can complete.

While these solutions increase the resilience of the simple hashing-based scheme to brute force analysis, they come at the cost of more expensive computation for clients. This is problematic for client devices, such as smart phones.

The above-referenced work of Colin Percival proposes the function scrypt that is sequential and memory-hard in the Random Oracle model. The function takes as input two cost parameters and so it can be used to drastically increase the cost of computing the function, for instance, by a factor of $2^s$. In the present setup, the client would perform a single computation of cost $\Omega(2^s)$ and the server would perform a single search for the hash in its set (which can be done in constant time via hash table or logarithmic time using a balanced binary try). The server would incur a one time cost of $O(|X|2^s)$ to compute the hashes for its set, but these hashes can be reused for all client queries. If the original cost to analyze the client's hash with brute force was $O(2^r)$, the cost is now $O(2^{r+s})$. However, the server can attempt to pre-compute the hash values for the entire universe, but the cost of this is increased by a factor of $O(2^s)$, which can be adjusted to be prohibitively expensive.

One weakness of this scheme comes from its strength. Namely, the cost of $O(2^s)$ to prevent server from a successful brute force analysis may be too expensive for a computationally-poor client. For instance, if the client is a smart-phone, performing $O(2^{32})$ memory operations is a great-deal more expensive than it is for a high-powered server to do the same. That is, an asymmetry in client-server computational power can undermine the security of the scheme as smaller values for s would need to be selected. In the next section, another scheme is proposed that does not suffer from this problem but achieves the same properties as this scheme.

FIG. 4 illustrates exemplary pseudo code 400 for an exemplary hash-based scheme. As shown in FIG. 4, S initially computes $H=\{h_i|h_i=f(x_i), x_i \in X\}$ during step 1. C computes $h_x=f(x)$ during step 2 and sends $h_x$ to S. S tests whether or not $h_x \in H$ during step 3 and sends the response back to C.

Bloom Filter-Based Scheme
A suite of solutions is provided using Bloom filters.
Background on Bloom Filters.
A Bloom filter is a probabilistic data structure that gives a compact representation of a set such that there are no false negatives and the false positive rate can be controlled. Consider a set X of n elements wherein each element could be quite large. The Bloom filter is constructed by creating an array M of m bits (all initialized to 0) and using k hash functions $h_i: X \rightarrow [1,m]$. For each element x in X, compute $h_1(x), \ldots, h_k(x)$ to get k positions in the m bit array. Set each $M[h_i(x)]$ to 1, wherein M[i] is the i-th bit of M. The Bloom filter is the final bitmask M.

For an element y, query whether or not it is in X by simply computing the value $h_i(y)$ for each $1 \le i \le k$ and querying each of the $M[h_i(y)]$ bits. Then, take the AND of all of the bits to get the result b. If b is 0, then y is not in the set X. If it were, then all of the corresponding bit positions would have been set and b would be 1. If b is 1, then it is likely that y is in X, but not guaranteed. In particular, because the hash functions are random, it is possible that all of the bit positions $h_1(y), \ldots, h_k(y)$ were set by some subset of elements in X. This false positive happens with probability at most $\varepsilon$, wherein $\varepsilon$ is a function of the number of bits in the filter m and the number of hash functions k. In particular, $\varepsilon \approx (1-e^{-kn/m})^k$.

Given n and m, the optimal number of hash functions is $k=(m/n) \ln 2$ and to achieve a false positive rate of $\varepsilon$, $k=\log_2 1/\varepsilon$. Thus, $m=n(\ln 2)(\log_2 1/\varepsilon)$.

FIG. 5 illustrates exemplary pseudo code 500 for an exemplary hash-based protocol based on Bloom filters. The exemplary Bloom filter has k hash functions $h_1, \ldots, h_k$. S initially computes the Bloom filter B for X during step 1 with $m=(1/\ln 2)kn$ bits, wherein $|X|=n$. S then sends descriptions of $h_1, \ldots, h_k$ to C during step 2. During step 3, C computes $q_i=h_i(x)$ for $i \in [1,k] \ldots$ C sends $q_1, \ldots, q_k$ to S during step 4 to fetch the corresponding bits from B. S computes $q=\wedge_{i=1}^{k} B[q_i]$ during step 5, wherein B[j] is the j-th bit of the Bloom filter B and $\wedge$ is bit-wise AND. S sends q back to C during step 6. During step 7, if $q=0$, then $x \notin X$. If $q=1$, then $x \in X$ with high probability (specifically, with probability $1-2^{-k}$).

Thus, for the exemplary Bloom filter-based protocol of FIG. 5, in conjunction with the embodiment of FIG. 1, the transformation 115 in step 3 comprises a Bloom filter-based transformation that maps the data element to k hash values by applying k hash functions to the data element, wherein the k hash functions are defined by the Bloom filter. The response 125 sent by the server S in step 6 is based on a result of a bit-wise aggregation 135 in step 5 of k bits from the Bloom filter, wherein a selection of the k bits is based on the mapping and wherein the k bits depend on one or more items in the data set by employing the k hash functions. The determination 130 of whether the data element is in the data set comprises determining whether the result of the bit-wise aggregation has a predefined value.

In a variation of the the exemplary Bloom filter-based protocol of FIG. 5, the aggregation can be performed by the client C. In such a client-side aggregation, the response 125 comprises k bits retrieved from the Bloom filter corresponding to a mapping of the data element x to k hash values by applying k hash functions to the data element x, wherein the k hash functions are defined by the Bloom filter, and wherein the determination of whether the data element x is in the data set X includes a bit-wise aggregation of at least a portion of the k bits.

Naïve Bloom Filter Construction.

In one construction based on Bloom filters, the Bloom filter is constructed for the set X the server has and it is divided into b fixed-sized blocks of consecutive bits. When a client C wants to query whether or not item x is in X, the client simply hashes x using each of the hash function to retrieve the bit indices for x. C then requests the k blocks containing the bit indices of x. Note that in this construction, the server knows the positions in the Bloom filter to which the hashes of the client input x get mapped, and thus can infer information about the value of x if $x \in X$. In this manner, the client retrieves the k blocks of bits from the Bloom filter and the client performs the aggregation locally itself.

For the exemplary naive Bloom filter construction, the response 125 comprises k blocks of bits retrieved from the Bloom filter based on the Bloom filter-based transformation of the data element x and wherein the determination 130 of whether the data element is in the data set performs a bit-wise aggregation 135 of selected bits from one or more of the k blocks of bits retrieved from the Bloom filter. The bit selection is based on a mapping of the data element to k hash values by applying k hash functions to the data element, wherein the k hash functions are defined by the Bloom filter.

Among other benefits, the exemplary naive Bloom filter construction permits an incremental determination of whether the data element is in the data set.

Adding Chaff Values.

Chaff values can be added to each request (i.e., request additional blocks of the Bloom filter) in order to hide which blocks the client input is mapped to. It can be shown that unless the amount of requested chaff is large (close to the size of the full Bloom filter), this solution provides only limited amount of privacy protection to the client.

Note that the set X can be updated over time and thus the client can make multiple queries over time with the same element x. If C chooses random chaff blocks for each query, then the server can simply take the intersection of the queries and quickly determine the k blocks desired by the client. Thus, C must query the same chaff each time. However, this assumes that the Bloom filter is not resized. If it must be resized, e.g., due to a false positive rate that is too high, then as part of the resizing, k new hash functions are selected (because the previous ones had a different output range) and the client must select new chaff blocks.

There is a generic attack that the server can perform on client queries to find out information about the client input x. First, assume the server has a set X of n elements, k hash functions, $m=n(\ln 2)(\log_2 1/\varepsilon)$, and that the Bloom filter is divided into b blocks of l bits each (so $m=bl$). Assume that in addition to k blocks that x maps to, the client requests c additional chaff blocks, randomly generated. The server enumerates all elements in the set X and the whole universe U (of size u) to identify a candidate set $Y \subset U$ to which x belongs. If Y is small, then the server identifies the client input x with high probability.

Proposition 1.

With the above parameterization, if c-randomly generated chaff blocks are added to each query, the expected size of the candidate set Y is upper-bounded by:

1. $E[Y] \leq 1 + n\left(\frac{k+c}{b}\right)^k$, if $x \in X$;

2. $E[Y] \leq u\left(\frac{k+c}{b}\right)^k$, if $x \in U \setminus X$.

Consider the following parameterization: $n=2^{27}$, $\varepsilon=2^{-128}$, so $k=128$, $m=2^{34}$, $l=2^{10}$, $b=2^{24}$, and $c=128$. With these parameters, $$P(T_y \subseteq T) \leq \left(\frac{256}{2^{24}}\right)^{128} = \left(\frac{1}{2^{16}}\right)^{128} = \frac{1}{2^{2048}},$$

giving an expected size of Y upper-bounded by $$\frac{1}{2^{2021}} + 1.$$

It can be observed that the server has an overwhelming probability of guessing the client input x.

How much of the Bloom filter must be requested by the client to prevent the server from learning that $x \in X$ can be quantified. Specifically, how much of the Bloom filter must be sent to have the expected size of candidate set Y be greater than or equal to some function $f$. Given a $\gamma$-fraction of the Bloom filter where, the probability that all k hashes for a given element $x \in X$ are in that $\gamma$-fraction is $\gamma^k$. Let Y be the set formed by the server after performing the "universe enumeration" on just the set X. Then, the expected size of the set $|Y|$ is $1+n\gamma^k$.

To have $1+n\gamma^k=f(n)$ for some function $f$, then:

$$1 + n\gamma^k = f(n)$$
$$\gamma^k = (f(n)-1)/n$$
$$\gamma = \sqrt[k]{(f(n)-1)/n}$$

To obtain, say, $E[|Y|]=f(n)=C$, for some constant C, then $$\gamma = \sqrt[k]{(C-1)/n},$$

which requires that $$m\sqrt[k]{(C-1)/n} = 1.44 \, kn^{(1-1/k)}\sqrt[k]{(C-1)}$$

bits are sent. For parameters wherein $k=32$, $n=2^{25}$ and $C=2^{10}$ (for example), $$1.44 * 2^5 * (2^{25})^{(31/32)} * \sqrt[32]{2^{10}} \approx 1.44 * 2^{29.22} * 2^{10/32} \approx 2^{30}$$

bits would need to be sent. Since the Bloom filter has $1.44*2^5*2^{25}=1.44*2^{30}$ bits, approximately a $1/1.44 \approx 0.694$—fraction of the Bloom filter would need to be sent.

Generating Chaff from Valid Inputs.

To somewhat mitigate the above attack, a different chaff generation method is proposed. Rather than choosing the c chaff blocks at random, z valid inputs are generated from the universe U and c are the blocks corresponding to hashes of these inputs. With this method, intuitively the client obtains z-anonymity in that its input is hidden among the set of z inputs. The following bounds follow immediately:

Proposition 2.

If the chaff is generated from the positions of z elements chosen form universe U (and thus $c=kz$), then the expected size of the candidate set Y is upper-bounded by:

1. $E[Y] \le 1 + n\left(\dfrac{k+c}{b}\right)^k$, if $x \in X$;

2. $E[Y] \le z + (u-z)\left(\dfrac{k+c}{b}\right)^k$, if $x \in U \setminus X$.

In light of the above analysis, there are several mitigations that can be added to the scheme to limit the amount of information the server learns about the client input. The client should query the same set of blocks each time whenever querying the same element x to prevent the server from taking a simple intersection and learning the k blocks wanted by the client. The ratio of chaff blocks c to the total number of blocks b should not be too small. Otherwise, the expected number of set items whose k blocks are in the c+k set is small. The chaff blocks should be selected by generating fake, properly formatted set items and adding their respective k blocks to the query. Accordingly, if there are z fake items, then the client has z-anonymity in the universe U.

Credit Card Application.

One possible application of this scheme is for users to check if their credentials, such as credit card numbers, have been stolen. Consider the feasibility of the above brute force attack with respect to credit card numbers. For the universe of credit card numbers, ostensibly there are $10^{16}$ possible credit cards with 16-digit card numbers. However, credit card numbers have a specific format wherein the first 6 digits are the issuer identification number, the next 9 digits are the account number, and the last digit is a checksum digit. So, already, there is a 10-fold decrease in the search space. For a given issuer, there can be at most $10^9$ (just under $2^{30}$) cards issued, which is feasible to obtain via a brute force analysis. Since Visa™ and MasterCard™ are the largest providers, a brute force analysis of just those two ranges will likely cover most client queries.

Credit cards also contain additional information beyond the 16-digit number that can be used to undermine a brute force analysis. (Indeed, the magnetic stripe on the card, which is often what is stolen, contains much more information.) In particular, each credit card has an expiration date, the card holder's name, and many have a 3-digit CVV (card verification value) code on the back as well. While adding these dimensions to the data increases the size of U, the set is still not exponentially large. According to the United States Census Bureau, for example, as of 2000 there are just over 150000 surnames in the United States that occur over 100 times. Moreover, these 150000 surnames covered nearly 90% of the total population with over half covered by the top 3300 names. In the 1990 census, there were approximately 5500 first names (male and female) in use in the United States. Furthermore, card validity periods are typically a handful of years with expiration dates at the granularity of months. This gives at most a few dozen to a few hundred additional possibilities.

Putting these all together, for a given issuer, the search space is approximately $2^{30}*2^{17}*2^{13}*2^7 = 2^{67}$ possibilities (assuming $2^7$ possible expiration dates), which is just past the edge of "feasibility." But, intelligent pruning can reduce this, for example, taking the top 3300 surnames reduces the search space by a factor of 45 giving a size of approximately $2^{61.5}$. If the server knows the client's name (e.g., if the server requires registration to use the service) then the search space is just $2^{37}$ (with perhaps an additional multiplicative factor for the middle initial). This implies that the brute force analysis of the entire credit card space, for a single issuer, is right at the edge of feasibility for the server if the name on the card is not known. If the name is known (e.g., the client must register before making queries) then it is entirely feasible for the server to obtain the number via brute force.

Privacy for the Server.

The dual concern stated above is that the server would like to keep the set private from overly curious clients. In particular, a client may try to learn about additional elements that are in the server's set X. When interacting with the server, the client retrieves k+c random blocks (out of b) possible, each containing 1 bits. The client can then perform the generic attack described above with the server but, instead, enumerates the universe U of possible set elements to learn the contents of X. Using the above analysis, the client will have (on average)

$$|U|\left(\dfrac{c+k}{b}\right)^k$$

elements and a ε-fraction will be false positives.

Bit-Level Chaff.

Instead of querying blocks of bits, the client can query individual bits from the Bloom filter. To maintain privacy of the server with respect to preventing leakage to the client of the additional chaff bits queried by the client, an additively homomorphic encryption scheme can be used as follows: The client can encrypt a binary value of 1 for each "real" index being queried and encrypt a binary value of 0 for any chaff such index, and provide these encrypted values to the server to be used as mask values. For each queried Bloom-filter bit b (corresponding to some index i), the server computes $b*c_b$, where $c_b$ is the unique ciphertext to be used as mask for the bit b in index i and which was provided by the client to the server as part of the query. If $c_b$ is an encryption of 1, then when the client decrypts, the plaintext will be the bit b. If $c_b$ is an encryption of 0, then the decrypted plaintext will also be 0, thus the client does not get to learn the chaff bits that were queried, and correspondingly the server does not get to learn which of the queried bits were real and which were chaff. The client can simply ignore all ciphertexts for the chaff queries, and hence only requires k decryptions for the response, where k is the number of real bit queries. If the cipher permits re-randomization, then the cost for the client to generate the queries is just 2 encryptions and k+c−2 re-randomizations, where c is the number of chaff bit queries.

Bloom Filters-Based Scheme with PIR

In light of the above discussions, the difficulty of providing strong privacy to both the client and server is evident (indeed, these two efforts are opposed to each other). To mitigate client privacy concerns, instead of fetching the bits directly, a private information retrieval scheme (PIR) is applied to fetch the desired k bits without revealing to the server which bits were fetched.

For a discussion of exemplary PIR schemes, see, for example, Calors Aguilar-Melcho and Philippe Gaborit, "A Lattice-Based Computationally-Efficient Private Information Retrieval Protocol," Second Western European Workshop on Research in Cryptology (WEWoRC), Vol. 4945 of Lectures Notes in Computer Science (2007); Casey Devet et al., "Optimally Robust Private Information Retrieval," Proc.

of the 21st USENIX Conference on Security Symposium, Security '12, Berkeley, Calif., USA (2012); Yael Gertner et al., "Protecting Data Privacy in Private Information Retrieval Schemes," Proc. of the 30th Annual ACM Symposium on Theory of Computing, STOC '98, pages 151-160, New York, N.Y., USA (1998); or Eyal Kushilevitz and Rafail Ostrovsky, "Replication is Not Needed: Single Database, Computationally-private Information Retrieval," Proc. of the 38th Annual Symposium on Foundations of Computer Science, FOCS '97, page 364, Washington, D.C., USA (1997).

FIG. 6 illustrates exemplary pseudo code 600 for an exemplary hash-based protocol utilizing Bloom filters and PIR in accordance with an aspect of the present invention, for an exemplary Bloom filter having k hash functions $h_1, \ldots, h_k$, and a (single-server, computational) PIR scheme P. During step 1, S computes the Bloom filter B for X with $m=(1/\ln 2)kn$ bits, wherein $|X|=n$. S sends descriptions of $h_1, \ldots, h_k$ to C during step 2. During step 3, C computes $q_i=h_i(x)$ for $i \in [1,k]$. C uses k parallel invocations of P during step 4 to retrieve bits $q_1, \ldots, q_k$. During step 5, C computes $q=\wedge_{i=1}^{k} B[q_i]$, wherein $B[j]$ is the j-th bit of the Bloom filter B and $\wedge$ is bit-wise AND. During step 6, if $q=0$, then $x \notin X$. If $q=1$, then $x \in X$ with high probability (specifically, with probability $1-2^{-k}$).

Thus, for the exemplary Bloom filter and PIR-based protocol of FIG. 6, in conjunction with the embodiment of FIG. 1, the transformation 115 in step 3 comprises a mapping of said at least one data element to k hash values by applying k hash functions to said at least one data element, wherein said k hash functions are defined by said Bloom filter. The determination 130 of whether the data element is in the data set is based on a result of a bit-wise aggregation 135 during step 5 and an evaluation of a value of the bit-wise aggregation 135 of k bits from the Bloom filter based on the mapping. The client C obtains the response 125 during step 4 using a private information retrieval (PIR) scheme. The response 125 comprises k bits from the Bloom filter, wherein the k bits are obtained using a private information retrieval (PIR) scheme. A selection of the k bits is based on the mapping, and the k bits depend on one or more items in the data set by employing the k hash functions. The determination 130 of whether the data element is in the data set comprises performing a bit-wise aggregation of at least a portion of the k bits and determining whether the result of the bit-wise aggregation has a predefined value.

Among other benefits, the exemplary the exemplary Bloom filter and PIR-based protocol of FIG. 6 permits an incremental determination of whether the data element is in the data set.

Previous work has explored the application of other cryptographic primitives (e.g., oblivious transfer) in combination with Bloom filters to guarantee clients' privacy. However, known prior scheme have linear communication costs for privately performing set membership test. The application of PIR protocols in one or more embodiments of the present invention enables sublinear communication cost to be achieved for the first time. With recent advances in PIR design based on lattice cryptography, the computational costs of the disclosed scheme is not prohibitive for practical deployment.

As an optimization, batch codes (see, e.g., Yuval Ishai et al., "Batch Codes and Their Applications," *Proc. of the Thirty-sixth Annual ACM Symposium on Theory of Computing*, STOC '04, pages 262-271, New York, N.Y., USA (2004)) allow for amortization of the PIR costs, In particular, the server divides its Bloom filter B into k blocks and encodes it with a batch (m,k,b) batch codes. The result is m blocks wherein the client must read at most b bits from each block to recover any k bits of the original Bloom filter. This allows m PIRs to be performed on segments of the filter instead of k PIRs on the entire Bloom filter.

PIR schemes, while they protect the client, offer no privacy guarantees for the server. Indeed, many PIR schemes are vulnerable to overly-curious clients that may fetch extra bits. PIR schemes the also provide privacy for the server are called symmetric PIRs (see, e.g., Yael Gertner et al., "Protecting Data Privacy in Private Information Retrieval Schemes," *Proc. of the 30th Annual ACM Symposium on Theory of Computing*, STOC '98, pages 151-160, New York, N.Y., USA (1998)). Fortunately, the above analysis implies that if the client does not retrieve a large portion of the Bloom filter, then it is very unlikely that the client will learn anything about the server's set X.

Two-Server Bloom Filters-Based Scheme with OPRF

In the case of multiple servers, the use of PIR schemes are not needed. In particular, with two servers $S_1$ and $S_2$, leakage from the plain Bloom filter scheme above (i.e., no PIR) can be prevented by having $S_1$ construct the Bloom filter using keyed hash functions but keeping the keys secret. In particular, $S_1$ would choose several secret keys, one for each of the k hash functions and then use the hash functions for constructing the Bloom filter. Once the Bloom filter is constructed, it is sent to $S_2$, but the keys are kept secret.

When a client C wishes to determine if its element s is in the servers' set X, C then engages in an OPRF protocol with S, to learn the k bit-indices associated with x. The client C then simply queries the corresponding bits from $S_2$.

Since the Bloom filter is constructed using keyed, secure hash functions, $S_2$ cannot "reverse-engineer" C 's query. $S_2$ still learns the result of the query, but that is all. The server $S_1$ learns nothing about the element x due to the security of the OPRF scheme.

Note that the k invocations of the OPRF protocol can be replaced with a single invocation. The result of that can be fed (by the client) into a key-derivation function to derive the k keys for the hash functions. (This, of course, requires the server to use the same key-derivation process.)

Use Case:

Major credit card providers, having their own PRF and having built a Bloom filter of compromised cards (or something else), send their Bloom filters to a central database (DB) that users can query. In this basic setup, the central DB would have a separate Bloom filter for each provider. Instead, the Bloom filter can be constructed to be the optimal filter for the union of the providers sets (this can be done by the providers simply sending the size of their set). Each provider still uses a PRF with a secret key but then interacts with the DB to set the appropriate bits.

Another use case comprises privately checking whether private personal data of a person (e.g, sensitive information) is in a private dataset of collected private personal data of a population of persons that are related to a specific private (sensitive) property. For example, a person's genome can be checked against a database of genomes (of patients) related to a particular disease.

In one exemplary implementation, the database can be calibrated to have an input set the size of the union of the sets and everyone has the same number of hash functions. The result is the superposition of "underfull" Bloom filters for each provider. That is, if there are three providers with n element sets, then the filter is configured for a 3n element set and the final result is a superpositioning of three Bloom filters, each of which are only one third full. Alternatively, the Bloom filter can be constructed to have 3k hash functions instead. Then, the resulting Bloom filter is the result of each provider only using a subset of the possible functions.

FIG. 7 illustrates exemplary pseudo code 700 for an exemplary hash-based scheme utilizing two-server Bloom filters and OPRF in accordance with an aspect of the present invention. The implementation of FIG. 7 assumes that the two servers $S_1$ and $S_2$ are non-communicating and non-colluding with one another. Server $S_1$ has a set $X=\{x_1, \ldots, x_n\}$, and server $S_2$ will hold a Bloom filter B. The exemplary OPRF scheme F is for a PRF $f$, and the Bloom filter has k hash functions $h_1, \ldots, h_k$, derived from $f$.

Server $S_1$ generates a random key k and uses $f_k(\cdot)$ to create the Bloom filter B during step 1 (possibly acting as both the Sender and Receiver in the OPRF protocol, if necessary). During step 2, $S_1$ sends B to $S_2$ but keeps k. C then interacts during step 3 with $S_1$ using F to learn $q_i=h_i(x)$ for $i \in [1,k]$. Finally, during step 4, C queries the Bloom filter bits in locations $q_1, \ldots, q_k$ directly from $S_2$. Bit-wise aggregation is then performed by the second server (or the client itself) in the manner described above.

Thus, for the exemplary Bloom filter and OPRF-based protocol of FIG. 7, in conjunction with the embodiment of FIG. 1, the transformation 115 in step 3 comprises a mapping of the data element to k hash values by applying k hash functions to the data element, wherein the k hash functions are defined by the Bloom filter. The Bloom filter-based transformation of the data element is obtained from the server $S_1$ as part of the response 125. Thus, the response 125 from the server comprises the Bloom filter-based transformation of the data element. Each of the k hash functions of the mapping comprises an oblivious pseudo random function (OPRF). The determination 130 of whether the data element is in the data set comprises obtaining a bit-wise aggregation of k bits from the Bloom filter stored at server $S_2$ and obliviously obtained from said server $S_1$ and determining whether said result of said bit-wise aggregation has a predefined value. A selection of the k bits is based on the mapping and the k bits depend on one or more items in the data set by employing the k OPRFs.

In a variation of the the exemplary Bloom filter-based protocol of FIG. 5, the aggregation can be performed by the client C. In such a client-side aggregation, the response 125 comprises k bits retrieved from the Bloom filter corresponding to a mapping of the data element x to k hash values by applying k hash functions to the data element x, wherein the k hash functions are defined by the Bloom filter, and wherein the determination of whether the data element x is in the data set X includes a bit-wise aggregation of at least a portion of the k bits.

Among other benefits, the exemplary Bloom filter and OPRF-based protocol of FIG. 7 allows an incremental determination of whether the data element is in the data set.

The exemplary protocol 700 assumes that $S_1$ cannot see any of the communications between the client and $S_2$ (implicit in the non-collusion of the servers). The OPRF step can be optimized to perform a single invocation of the protocol to obtain a secret key $k_x$ corresponding to x (which would be different for each x). This key can then be used in a key-derivation function to compute keyed-hashes for $h_1, \ldots, h_k$.

The disclosed PIR-based scheme can be improved using batch codes (see, e.g., Yuval Ishai et al., "Batch Codes and Their Applications," *Proc. of the Thirty-sixth Annual ACM Symposium on Theory of Computing*, STOC '04, pages 262-271, New York, N.Y., USA (2004)) that amortize the cost of PIR. In addition, using multiple servers allows for using information-theoretic PIR schemes (such as those described in Casey Devet et al., "Optimally Robust Private Information Retrieval," *Proc. of the 21st USENIX Conference on Security Symposium, Security '12*, Berkeley, Calif., USA (2012)) that can be more efficient than single-server computational schemes (see, e.g., Femi Olumofin and Ian Goldberg, "Revisiting the Computational Practicality of Private Information Retrieval," *Proc. of the 15th International Conference on Financial Cryptography and Data Security*, FC '11, pages 158-172 (February 2011).

CONCLUSION

The foregoing applications and associated embodiments should be considered as illustrative only, and numerous other embodiments can be configured using the techniques disclosed herein, in a wide variety of different cryptography applications.

For example, both the split server and the auxiliary-channel handling methods described herein can be extended in the case of more than two servers, assuming a token-side design that supports such extensions. For instance, if a passcode comprises of three protocode parts, say red, blue and green, then vertical splitting can be considered into three corresponding parts. Splitting into more parts than the number of protocodes is also possible if the appropriate pseudorandom information is appropriately disseminated among the servers. Similarly, auxiliary-channel handling can be supported in multi-server settings.

It should also be understood that split-server verification, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described herein can provide a number of significant advantages relative to conventional practice. For example, these embodiments can advantageously provide improved scalability and support of auxiliary channels. Also, a wide variety of different one-time passcode (OTP) verification protocols can be implemented using the disclosed techniques.

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Referring now to FIG. 8, one possible processing platform that may be used to implement at least a portion of one or more embodiments of the invention comprises cloud infrastructure 800. The cloud infrastructure 800 in this exemplary processing platform comprises virtual machines (VMs) 802-1, 802-2, ... 802-M implemented using a hypervisor 804.

The hypervisor 804 runs on physical infrastructure 805. The cloud infrastructure 800 further comprises sets of applications 810-1, 810-2, ... 810-M running on respective ones of the virtual machines 802-1, 802-2, ... 802-M under the control of the hypervisor 804.

The cloud infrastructure 800 may encompass the entire given system or only portions of that given system, such as one or more of client, servers, controller, authentication server or relying server in the system.

Although only a single hypervisor 804 is shown in the embodiment of FIG. 8, the system may of course include multiple hypervisors each providing a set of virtual machines using at least one underlying physical machine.

An example of a commercially available hypervisor platform that may be used to implement hypervisor 804 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system.

Figure 9:
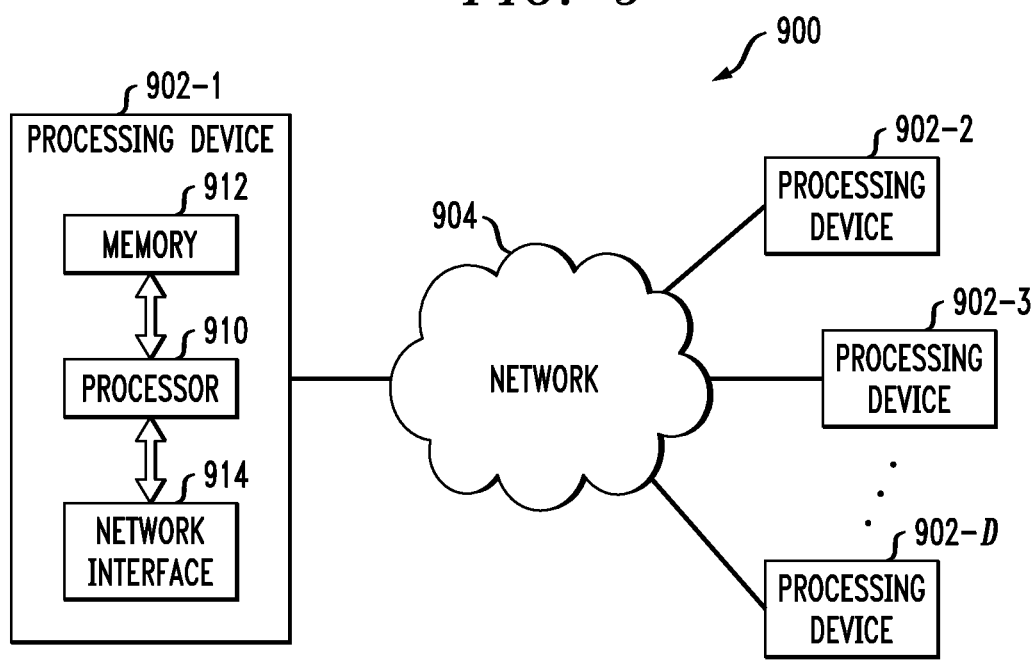
FIG. 9 illustrates another exemplary processing platform that may be used to implement at least a portion of one or more embodiments of the invention.

Another example of a processing platform is processing platform 900 shown in FIG. 9. The processing platform 900 in this embodiment comprises at least a portion of the given system and includes a plurality of processing devices, denoted 902-1, 902-2, 902-3, ... 902-D, which communicate with one another over a network 904. The network 904 may comprise any type of network, such as a wide area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), an field programmable gate array (FPGA) or other type of processing circuitry, as well as portions or combinations of such circuitry elements, and the memory 912, which may be viewed as an example of a "computer program product" having executable computer program code embodied therein, may comprise random access memory (RAM), read only memory (ROM) or other types of memory, in any combination.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 8 or 9, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for determining whether at least one data element of a client is in a data set of a server, said method comprising:
    obtaining at said client, using at least one processing device, a transformation of said at least one data element;
    receiving at said client, using at least one processing device, a response from said server based on said transformation of said at least one data element, wherein said transformation comprises one or more of a Bloom filter-based transformation that employs a Bloom filter comprising a plurality of hash functions and an encryption-based transformation; and
    determining at said client, using at least one processing device, whether said at least one data element is in said data set based on said response, wherein one or more of said response and said determining is based on a result of at least one aggregation of a plurality of values that depend on said at least one data element and one or more items in said data set as chaff values configured to obscure said at least one data element within the aggregation of said plurality of values.

2. The method of claim 1, wherein said Bloom filter-based transformation of said at least one data element comprises a mapping of said at least one data element to k hash values by applying k of said plurality of hash functions to said at least one data element, wherein said k hash functions are defined by said Bloom filter.

3. The method of claim 2, wherein said response is based on said result of at least one aggregation and wherein said at least one aggregation comprises performing a bit-wise aggregation of k bits from said Bloom filter stored at said server, wherein a selection of said k bits is based on said mapping and wherein said k bits depend on said one or more items in said data set by employing said k hash functions.

4. The method of claim 3, wherein said step of determining whether said at least one data element is in said data set comprises determining whether said result of said bit-wise aggregation has a predefined value.

5. The method of claim 2, wherein said response comprises k blocks of bits from said Bloom filter stored at said server, wherein a selection of said k blocks of bits is based on said mapping, wherein said k blocks of bits depend on one or more items in said data set by employing said k hash functions and wherein said determining whether said at least one data element is in said data set comprises:
performing a bit-wise aggregation of one or more bits from at least a portion of said k blocks of bits, wherein a selection of said one or more bits is based on said mapping; and
determining whether said result of said bit-wise aggregation has a predefined value.

6. The method of claim 2, wherein said response comprises k bits from said Bloom filter stored at said server, wherein said k bits are obtained using a private information retrieval (PIR) scheme, wherein a selection of said k bits is based on said mapping, and wherein said k bits depend on one or more items in said data set by employing said k hash functions.

7. The method of claim 6, wherein said determining whether said at least one data element is in said data set comprises performing a bit-wise aggregation of at least a portion of said k bits and determining whether said result of said bit-wise aggregation has a predefined value.

8. The method of claim 2, wherein said Bloom filter-based transformation of said at least one data element is obtained from said server as part of said response, wherein said response from said server comprises said Bloom filter-based transformation of said at least one data element and wherein said k hash functions of said mapping each comprises an oblivious pseudo random function (OPRF).

9. The method of claim 8, wherein said determining whether said at least one data element is in said data set comprises obtaining a bit-wise aggregation of k bits from said Bloom filter stored at a second server and obliviously obtained from said server, wherein a selection of said k bits is based on said mapping and wherein said k bits depend on one or more items in said data set by employing said k OPRFs, and determining whether said result of said bit-wise aggregation has a predefined value.

10. The method of claim 2, wherein said response comprises k bits from said Bloom filter, wherein a selection of said k blocks of bits is based on said mapping, wherein said k blocks of bits depend on one or more items in said data set by employing said k hash functions and wherein said determining whether said at least one data element is in said data set comprises performing a bit-wise aggregation of at least a portion of said k bits and determining whether said result of said bit-wise aggregation has a predefined value.

11. The method of claim 1, wherein said Bloom filter employed by said Bloom filter-based transformation is computed over one or more of items of said data set prior to said obtaining by applying one or more of said plurality of hash functions on said data set.

12. The method of claim 1, wherein said encryption-based transformation comprises one or more of an encrypted version of said at least one data element and an encrypted version of d powers of said at least one data element.

13. The method of claim 12, wherein said response is based on said result of at least one aggregation of said plurality of values and wherein said plurality of values is based on one or more comparisons between said encryption-based transformation of said at least one data element and an encrypted version of one or more items in said data set.

14. The method of claim 13, wherein said response comprises a result of a product aggregation of values, wherein each of said values comprises a comparison between said encryption-based transformation of said at least one data element and an encrypted version of one item in said data set.

15. The method of claim 13, wherein said determining whether said at least one data element is in said data set comprises determining whether a decrypted version of said response has a predefined value.

16. The method of claim 13, wherein said at least one aggregation comprises at least one aggregation of values for each subset in a plurality of subsets in a partition of said data set, wherein each of said subsets has at least two items, and wherein said values for each subset are based on one or more comparisons of one or more encrypted versions of d powers of said at least one data element and said encrypted version of said one or more items in said subset.

17. The method of claim 16, wherein for each of said subsets, said at least one aggregation comprises a sum over weighted versions of said encrypted versions of d powers of said at least one data element, wherein said weighted versions comprise a weighted sum aggregation of said encrypted version of said one or more items in said subset.

18. The method of claim 17, wherein said determining whether said at least one data element is in said data set comprises determining whether a decrypted version of each of final results for one or more of said subsets has a predefined value.

19. The method of claim 1, wherein said encryption-based transformation employs a homomorphic encryption scheme.

20. The method of claim 12, wherein said encrypted version of said one or more items in said data set is generated by said server substantially contemporaneously with a generation of said response.

21. The method of claim 1, wherein said response is based on a test performed on one or more of said transformation of said at least one data element and a transformation of said data set.

22. The method of claim 1, wherein said response from said server is further based on a transformation of said data set.

23. The method of claim 1, further comprising deterministically partitioning said data set into a plurality of disjoint subsets and applying one or more of said Bloom filter-based transformation and said encryption-based transformation to each of said plurality of disjoint subsets to determine whether said at least one data element is in said data set.

24. The method of claim 1, wherein said at least one data element comprises one or more of a credit card number, a user credential and a personal data item, and wherein said data set comprises one or more of a list of stolen credit card numbers, a list of compromised credentials and a data set of personal data.

25. The method of claim 1, wherein one or more of a communication cost and a computation cost are less than a linear proportion of a size of a set comprised of said at least one data element and said data set.

26. The method of claim 1, wherein said transformation of said at least one data element comprises a privacy-preserving transformation.

27. The method of claim 1, wherein said at least one aggregation does not reveal said one or more items in said data set to said client.

28. An apparatus for determining whether at least one data element of a client is in a data set of a server, said apparatus comprising:
   a memory; and
   at least one processing device, coupled to the memory, operative to implement the following steps:
      obtaining at a client, using at least one processing device, a transformation of said at least one data element;
      receiving at a client, using at least one processing device, a response from said server based on said transformation of said at least one data element, wherein said transformation comprises one or more of a Bloom filter-based transformation that employs a Bloom filter comprising a plurality of hash functions and an encryption-based transformation; and
      determining at a client, using at least one processing device, whether said at least one data element is in said data set based on said response, wherein one or more of said response and said determining is based on a result of at least one aggregation of a plurality of values that depend on said at least one data element and one or more items in said data set as chaff values configured to obscure said at least one data element within the aggregation of said plurality of values.

29. The apparatus of claim 28, wherein said encryption-based transformation comprises an encrypted version of said at least one data element, wherein said response comprises a product aggregation of values, wherein each of said values comprises a comparison between said encryption-based transformation of said at least one data element and an encrypted version of an item in said data set, and wherein said determining whether said at least one data element is in said data set comprises evaluating a decrypted version of said response and determining whether said result of said decryption evaluation has a predefined value.

30. The apparatus of claim 28, wherein said encryption-based transformation comprises an encrypted version of d powers of said at least one data element, wherein said at least one aggregation comprises at least one aggregation of values for each subset in a plurality of subsets in a partition of said data set, wherein each of said subsets has at least two items, and wherein said values for each of said subsets are based on one or more comparisons of one or more of said encrypted version of d powers of said at least one data element and an encrypted version of said one or more items in said subset, wherein for each of said subsets, said at least one aggregation comprises a sum over weighted versions of said encrypted version of d powers of said at least one data element, wherein said weighted versions comprise a weighted sum aggregation of said encrypted version of said one or more items in said subset, wherein said determining whether said at least one data element is in said data set comprises determining whether a decrypted version of each of final results for one or more of said subsets has a predefined value.

31. The apparatus of claim 28, wherein said Bloom filter-based transformation of said at least one data element comprises a mapping of said at least one data element to k hash values by applying k hash functions to said at least one data element, wherein said k hash functions are defined by said Bloom filter, wherein said response is based on said result of at least one aggregation and wherein said at least one aggregation comprises performing a bit-wise aggregation of k bits from said Bloom filter stored at said server, wherein a selection of said k bits is based on said mapping and wherein said k bits depend on said one or more items in said data set by employing said k hash functions, and wherein said determining whether said at least one data element is in said data set comprises determining whether said result of said bit-wise aggregation has a predefined value.

32. The apparatus of claim 28, wherein said Bloom filter-based transformation of said at least one data element comprises a mapping of said at least one data element to k hash values by applying k hash functions to said at least one data element, wherein said k hash functions are defined by said Bloom filter, wherein said response comprises k bits from said Bloom filter stored at said server, wherein said k bits are obtained using a private information retrieval (PIR) scheme, wherein a selection of said k bits is based on said mapping, wherein said k bits depend on one or more items in said data set by employing said k hash functions, and wherein said determining whether said at least one data element is in said data set comprises performing a bit-wise aggregation of at least a portion of said k bits and determining whether said result of said bit-wise aggregation has a predefined value.

33. The apparatus of claim 28, wherein said Bloom filter-based transformation of said at least one data element comprises a mapping of said at least one data element to k hash values by applying k hash functions to said at least one data element, wherein said k hash functions are defined by said Bloom filter, wherein said Bloom filter-based transformation of said at least one data element is obtained from said server as part of said response, wherein said response from said server comprises said Bloom filter-based transformation of said at least one data element and wherein said k hash functions of said mapping each comprises an oblivious pseudo random function (OPRF), and wherein said determining whether said at least one data element is in said data set comprises obtaining a bit-wise aggregation of k bits from said Bloom filter stored at a second server and obliviously obtained from said server, wherein a selection of said k bits is based on said mapping and wherein said k bits depend on one or more items in said data set by employing said k OPRFs, and determining whether said result of said bit-wise aggregation has a predefined value.

34. A computer program product for determining whether at least one data element of a client is in a data set of a server, comprising a non-transitory machine-readable storage medium having encoded therein executable code of one or more software programs, wherein the one or more software programs when executed perform the following steps:
   obtaining at said client, using at least one processing device, a transformation of said at least one data element;
   receiving at said client, using at least one processing device, a response from said server based on said transformation of said at least one data element, wherein said transformation comprises one or more of a Bloom filter-based transformation that employs a Bloom filter comprising a plurality of hash functions and an encryption-based transformation; and
   determining at said client, using at least one processing device, whether said at least one data element is in said data set based on said response, wherein one or more of said response and said determining is based on a result of at least one aggregation of a plurality of values that depend on said at least one data element and one or more items in said data set as chaff values configured to obscure said at least one data element within the aggregation of said plurality of values.

* * * * *